(12) United States Patent
Barich

(10) Patent No.: US 7,514,497 B2
(45) Date of Patent: Apr. 7, 2009

(54) METHOD FOR THE PRODUCTION OF AT LEAST ONE BODY AND A POURABLE MIXTURE FOR USE IN SUCH A METHOD

(75) Inventor: Gerhard Barich, Weichs (DE)

(73) Assignee: C.H. Erbsloeh KG, Krefeld (DE)

( * ) Notice: Subject to any disclaimer, the term of this patent is extended or adjusted under 35 U.S.C. 154(b) by 1112 days.

(21) Appl. No.: 10/398,722

(22) PCT Filed: Oct. 8, 2001

(86) PCT No.: PCT/DE01/03815

§ 371 (c)(1),
(2), (4) Date: Sep. 26, 2003

(87) PCT Pub. No.: WO02/30649

PCT Pub. Date: Apr. 18, 2002

(65) Prior Publication Data

US 2004/0041290 A1    Mar. 4, 2004

(30) Foreign Application Priority Data

Oct. 9, 2000  (DE) .............................. 100 49 753
Aug. 16, 2001 (DE) .............................. 101 40 036

(51) Int. Cl.
    *C08L 53/00* (2006.01)
(52) U.S. Cl. .................. 524/505; 524/507; 524/525
(58) Field of Classification Search ............. 524/505, 524/507, 525
    See application file for complete search history.

(56) References Cited

U.S. PATENT DOCUMENTS 4,125,506 A * 11/1978 Lundberg et al. ........... 524/577
5,668,209 A *  9/1997 Ruch et al. .................. 524/555
5,900,455 A *  5/1999 Breuer et al. ................ 524/575

* cited by examiner

*Primary Examiner*—Peter D Mulcahy
(74) *Attorney, Agent, or Firm*—Abelman, Frayne & Schwab

(57) ABSTRACT

According to the invention a body may be produced in plastic, in particular by means of rotational casting method, by using a suspension or paste with plastic particles, comprising at least partly a thermoplastic elastomer, in particular SEBS, SBS or TPU. Said invention presents the advantage of no danger to health.

38 Claims, No Drawings

METHOD FOR THE PRODUCTION OF AT LEAST ONE BODY AND A POURABLE MIXTURE FOR USE IN SUCH A METHOD

DESCRIPTION

The invention relates to a method for the production of at least one body and a flowable mixture for use in such a method.

For the manufacture and processing of plastic or polymer materials a large number of different methods are known. A rough survey of these known processes can be found, for example, in Adolf Franck, *"Kunststoff-Kompendium"*, 5th Edition, Vogel-Verlag, Würzburg, 2000, pp. 141 to 206.

One of the known methods of manufacturing solid objects from plastic is based on the processing of pastes or suspensions comprising particles of plastic, or of a compound with plastic components, contained in a fluid substance (cf. Adolf Franck, *"Kunststoff-Kompendium"*, pp. 149, 190 and 191). The terms "paste" and "suspension" are used in the present application to designate all flowable mixtures of particles and fluids, and hence denote both those mixtures that flow readily, having a low viscosity, and those with a thick consistency, having a high viscosity (therefore called "viscous").

The processing of pastes, suspensions or plastisols is carried out, according to Adolf Franck, *"Kunststoff-Kompendium"*, p. 190, almost exclusively with polyvinyl chloride (PVC) powder and plasticizers, and when the goal is to produce soft PVC, the powder is rendered soluble by a gelation process. For this purpose PVC powder made from high-molecular-weight PVC plastic is first thoroughly mixed with stabilizers, lubricants and, where appropriate, pigments, as well as with 20% to 60% plasticizer, depending on the hardness desired in the end product, to produce a paste or suspension. Significant factors here are the nature of the granules in the PVC powder (powder density) and their size. The flowable mixture produced by mixing the PVC powder and additives is also called a "(soft PVC) plastisol". During the gelation process the high-molecular-weight PVC powder, mixed with plasticizer or suspended, becomes swollen and melted when its temperature exceeds a specified level. At a sufficiently high temperature, when a sufficiently long time has elapsed, the plasticizer begins to migrate into the PVC molecular structure, which causes a distinct increase in viscosity. During cooling the viscosity increases still further and a solid body is formed, within the molecular meshwork of which the plasticizer molecules are embedded. The greater the amount of embedded plasticizer, the less mechanically stable is the product and the greater its flexibility. The body so produced is also called a "plastigel" and has the properties of an elastic solid (cf. Adolf Franck, *"Kunststoff-Kompendium"*, pp. 190 and 191).

This gelation process, according to Adolf Franck, *"Kunststoff-Kompendium"*, p. 191, can be employed for various kinds of processing in which plastisols composed of plastic powder, plasticizer and additives are caused to solidify by heating.

The first such process to be mentioned is casting, in which the paste is poured into a mold (or applied to a form tool) and heated. After gelation and cooling the finished body is removed from the mold. If only a peripheral layer is allowed to gel and the remaining paste is poured out, a hollow body is obtained.

A second manufacturing process is rotational casting, in which alternately heatable and coolable tools are rotated about two axes in order to produce hollow bodies made of thermoplastics (Adolf Franck, *"Kunststoff-Kompendium"*, p. 148). In order to produce hollow bodies made of polyvinylchloride (PVC) plastic, a calculated amount of paste or suspension is gelled following application to the hot wall of a form tool that is rotating about two axes ("tumbling"), and after cooling is removed from the form as a finished hollow body (Adolf Franck, *"Kunststoff-Kompendium"*, p. 191).

Dipping is a third method of manufacture; in the dipping process hot mold cores or objects are dipped into the paste or suspension. The fluid material that comes into contact therewith gels to form a layer that adheres to the hot mold core or to the object to be coated. After being withdrawn from the paste, the mold core or object is heated in an oven to more than 180° C., as a result of which the soft PVC finishes the gelation process and is brought into a homogeneous state.

Finally, as a fourth procedure, a coating process is also known in which PVC paste is brushed onto strips of woven or nonwoven fabric, or of paper, and a PVC layer is subsequently produced by gelation of the paste in a heating channel.

Bodies produced by means of PVC pastes or PVC suspensions find application in extremely diverse areas, for instance in technology as bellows-type structures, automobile door supports and the like, in the leisure or sport area as balls, etc., in the consumer area as garden dwarves or statuary in general, etc., and in the areas of hygiene or toys in general as puppets, dolls or parts thereof. They can also be used as coatings of textiles or woven glass fabrics, in producing tarpaulins or awnings as well as floor coverings, to provide protection under floors, as seals, in the manufacture of gloves (by dipping) or conveyor belts, in the packaging industry, and for coating tool handles or clothes hangers or wires for garden fences.

In many cases there are problems associated with the fact that the PVC bodies can come into close contact with a human body or with body fluids. All accessory agents, in particular the plasticizers, are therefore subject to restrictions regarding their nature and quantity when groceries or children's toys are involved. For example, there are already EU prohibitions on the use of such products for toys or the like that are intended for children up to the age of three years. A central problem in the case of PVC plastisols with plasticizers is the unavoidable migration of the plasticizer in the course of time, which is intensified at elevated temperatures. Having migrated to the surface, the plasticizer is then taken up by human bodies that come into contact with it.

In the German patent DE 299 19 849 U1, therefore, toys and structural parts thereof, in particular dolls and toys for young children or babies, are proposed that consist of the plastic polyurethane (PUR), which contains no plasticizer but has residual elastic properties in the hardened state. According to statements in that document, such toys are generally recognized as safe for oral contact with a child or infant. As a basic material for these PUR toys and parts of toys, DE 299 19 849 U1 further discloses a mixture of two fluid reactive components in a ratio between 100:30 and 100:70. As the first of these reactive components a polyol with hydroxyl groups as functional groups and additives is proposed, and as the second reactive component an isocyanate or a prepolymer on the basis of 4,4-diphenyl-methane diisocyanate with reactive NCO groups. As additives for the first reactive component with the polyol the following can be employed: chain lengtheners, catalyzers, stabilizers, water-binding agents, dyes in paste or another form, lighteners, antioxidants, perfumes, fillers or strengthening substances and internal separating agents. The two components are mixed in the prescribed ratio and put into a mold, in particular a hollow one. The mixture is adjusted such that the desired degree of softness of the subsequent doll is reached after a prespecified reaction time, e.g. in an industrial heating furnace, and a following post-curing at room temperature. After the mixture has been introduced into a hollow mold that has been provided with a separating agent, the mold is closed and the fluid mixture is centrifuged. The thermoreactive initial components, of low to intermediate molecular weight, react according to a polyaddition reaction known per se to produce an end product that now contains no monomers and consists only of a single macromolecule; there are no longer any free reactive groups in the product after the reaction. It is also possible for several molds to be filled with the reaction mixture and put into rotational motion simultaneously by a suitable mechanical apparatus. The individual parts of a doll can also be produced as shells, i.e. separate hollow structures. After the mold has been opened, the molded parts can be removed and processed further in the customary manner.

When the material selected for this purpose is as described in DE 299 19 849 U1, namely a PUR plastic, the health risks associated with use of the conventional soft plastics made of polyvinylchloride (PVC) are avoided. However, if toxic hardener systems are employed, health-related problems may still be encountered.

The object of the present invention is to provide a method for the production of bodies made of plastic or a plastic-containing containing composite that present no risk to health and in general contain no PVC, but have properties that are comparable with those of PVC and can be adjusted within very wide limits. Furthermore, a flowable mixture that can be used in such a method is to be described.

This object is achieved with respect to the method by the characteristics given in claim 1 and with respect to the flowable mixture by the characteristics given in claim 27.

In the method according to claim 1 at least one body is produced from a flowable mixture, in particular a paste or suspension, which contains or comprises particles that consist at least partially of thermoplastic elastomer in a fluid.

The terms "contain" and "comprise" in the entire present application fundamentally, and where applicable, also include the subordinate meaning "consist of". That means in particular for the particles suspended in the mixture that these can consist not only in part (or: partially), but also completely of thermoplastic elastomer (TPE). In the following the particles are also occasionally referred to as "plastic particles" for simplification, but this term should be understood to include particles that consist only partially of plastic. In the entire present application the term "flowable mixture" is used for mixtures of particles and a fluid which are capable of flowing, in particular suspensions or pastes. The term "flowable mixtures" also includes the meanings mixtures which have or show "flowability" as well as "pourable mixtures" and "fluid mixtures". The shape of the body produced with the method in accordance with the invention is in principle arbitrary. In particular, closed or partially open hollow bodies, bodies in the shape of a half shell or flat bodies can be produced. Furthermore, the bodies can be self-supporting or not; in the latter case they can, for example, be produced as coatings.

The invention is based on the surprising realization that in a method of producing bodies made of plastic that is known in PVC technology, it is possible to eliminate a PVC paste or PVC suspension as the raw material and to replace it by a suspension or paste with at least one thermoplastic elastomer (or: a thermoplast that is flexible at the temperatures that will prevail during use) Thus the invention overcomes a prejudice among experts in this area, namely that the processing of pastes or suspensions is not suitable for producing bodies from thermoplastic elastomers (cf. overview table in Adolf Franck, "*Kunststoff-Kompendium*", p. 149). The invention now has the great advantage that with a technology that is substantially unchanged, or not substantially divergent, regarding both method and apparatus, plastic bodies can be produced that are entirely comparable in their characteristics to bodies made of soft PVC, in particular as regards their elasticity. The invention thus makes it possible for existing tools and installations for the manufacture of PVC bodies to be retained or continued to be used for the manufacture of PVC-free plastic bodies. The thermoplastic elastomers employed in accordance with the invention, in contrast to PVC, do not require any plasticizers that might pose risks to health. An advantage of the measures according to the invention in comparison to the manufacturing process disclosed in DE 299 19 849 U1 is that there is no need for the mixing of fluid components, in which process bubbles might form with potential negative consequences for the consistency of the finished hollow body, nor any need for a curing process by means of potentially toxic hardener systems.

The flowable mixture, in particular suspension or paste according to claim 27, comprises (a) a powder consisting of one or more thermoplastic elastomers and preferably additional substances, in particular at least one thermoplast and/or fillers and/or additives and/or coloring agents, with a granule size at least predominantly smaller than 500 μm and (b) a fluid in which the powder is suspended.

Advantageous elaborations, further developments and applications of the method in accordance with the invention will be evident from the claims dependent on claim 1.

In an especially advantageous embodiment the body is generated or formed from the flowable mixture with the TPE or TPEs by gelation of the mixture at at least one prespecified or specifiable processing temperature (or: a prescribed process-temperature profile, thermal conditions), in general under the application of heat or a temperature elevation, as a result of which gelation process the mixture solidifies.

As manufacturing processes involved in forming the body from the flowable mixture it is possible to use, in particular, each of the processes known per se for working with PVC plastisols, in which as a rule a gelation event is employed. The preferred processes are as follows, and can be selected depending on the desired configuration or the desired properties of the body to be manufactured.

A first such process is characterized by loading a mold (or a form tool) with the flowable mixture and subsequently forming the body, in particular hollow body, in the mold by bringing the mold to at least one prespecified processing temperature and/or keeping it at at least one prespecified processing temperature.

In a casting procedure the remaining mixture can be poured out, or in a rotational casting method the mold can be rotated (or: tumbled), in particular with at least two rotational degrees of freedom or multiaxially. In both cases what is thereby produced is in general a hollow body. Advantageously the mold is then cooled, after a prespecified period of time or after the body has been formed, in general to room temperature or below, and the hollow body is removed from the mold. In particular, the mold is rotated in an oven and preferably thereafter taken from the oven and subsequently cooled. To manufacture several hollow bodies, a corresponding number of molds are filled with the suspension, or a single mold is filled several times in succession.

In a dipping method, as a second such process,
again at at least one processing temperature an object to be coated or a mold is dipped into the flowable mixture and the body then forms itself on the object or the mold directly or, in some circumstances, after a subsequent gelation at higher temperature.

A body formed in this way now remains on the object, in particular as a coating, or is removed from the mold, where appropriate after cooling.

A coating method that counts as a third manufacturing process is characterized by the following steps:
brushing the flowable mixture onto an object at at least one first processing temperature and
forming the body as a coating on the object at at least one second processing temperature, which in general is different from and as a rule is higher than the first processing temperature.

The processing temperature(s) for the production or manufacturing process in accordance with the invention is/are in general set to or kept in a range between about 50° C. and about 350° C., in particular however between about 160° C. and about 260° C., and preferably near about 200° C.

An especially advantageous area in which to employ the method in accordance with the invention is the production of toys, in particular dolls, or parts thereof. However, application of the invention is not restricted to this specialized area. With a method or a flowable mixture in accordance with the invention it is possible to produce bodies or parts thereof for extremely diverse purposes, in particular technical ones—for instance, to serve as bellows or automobile door supports or sealing structures or conveyor belts. Examples of other areas include the following: the leisure or sport area, e.g. balls or gloves; the consumer area, e.g. garden dwarves or other statuary; and also the areas of hygiene or packaging. The invention can also be used to produce tarpaulins or floor coverings or under-floor protection means, as well as coatings for textiles, woven glass fabrics, tool handles, clothes hangers or wires for garden fences.

The thermoplastic elastomer(s) in the flowable mixture, in particular paste or suspension, in accordance with the invention comprises/comprise preferably a styrol-ethylene-butylene-styrol (SEBS) and/or a styrol-butadiene-styrol (SBS) and/or a thermoplastic polyurethane (TPU).

The flowable mixture can include particles that are made of a substantially identical plastic compound, or comprise several different plastic compounds that include at least one thermoplastic elastomer and/or respectively consist of at least one thermoplastic elastomer.

The proportion of thermoplastic elastomer (TPE) in the particles in the flowable mixture can range from 1% by weight to 100% by weight. In particular, besides TPE the particles can also contain other substances or compounds, in particular one or more thermoplast(s) (TP), with the exception of the (amorphous) thermoplast PVC itself, and/or at least one filler and/or at least one coloring agent and/or at least one additive. As additional thermoplast(s) there can preferably be provided a polypropylene (PP) and/or a polyethylene (PE) and/or a polybutylene (PB) and/or a polystyrol (PS). The proportion of the additional thermoplast(s) in the particles within the flowable mixture is preferably between 0% and about 80% by weight.

Regarding the dimensions of the particles in the mixture, embodiments are preferred in which generally at least 50%, in particular at least 80%, preferably 95% or even 99% of the plastic particles do not exceed a specific particle size. As the maximal particle size, 500 μm or 300 μm or 100 μm or 50 μm or 10 μm or even as little as 1 μm can be selected.

Regarding the constitution or shape of the particles in the flowable mixture, there are a large number of possibilities from which to choose. Preferably at least some of the particles have the shape of a seed, ball or fiber.

The flowable mixture, suspension or paste in accordance with the invention can be or have been produced in various ways.

In a first advantageous embodiment the original material or product (or: raw material), containing the appropriate plastics and as the case may be supplementary substances, is cryogenically ground into particles or grains and subsequently these particles are, or the cryogenically ground powder is, put into a fluid.

In an alternative, especially advantageous embodiment a raw material containing the thermoplastic elastomer(s) and as the case may be additional components is granulated and the granular particles so obtained are used for the suspension. As granulation process in particular a heat-breakdown microgranulation process, preferably an underwater microgranulation, or a droplet granulation can be used, in particular with subsequent water separation and/or drying of the granulated material thus obtained.

The plastic raw material for cryogenic grinding or granulation is preferably produced by extrusion and thereby plasticized.

Various materials and substances can be added to or mixed into the mixture or the particles in the mixture or the raw material for producing the particles in the mixture, in order to influence the intrinsic properties of the resulting substance, or its properties with respect to processing, in particular
fillers, in particular talcum and/or chalk and/or mineral powder and/or duroplastic powder and/or glass powder and/or soot and/or titanium dioxide and/or calcium carbonate, preferably in a proportion between 0 and 80% by weight.
additives, in particular flow-improving agents and/or thermal stabilizers and/or photostabilizers and/or aging stabilizers and/or parting agents and/or anti-foam agents and/or emulsifiers.
coloring agents, in particular coloring pigments and/or their accessory agents and/or liquid dyes.

The fluid in the flowable mixture can contain, in particular consist of, a natural vegetable oil, a petroleum derivative and/or a paraffinic white oil. Substances that can serve as additives can be flow-improving agents and/or thermal stabilizers and/or photostabilizers and/or aging stabilizers and/or separating agents and/or anti-foam agents and/or emulsifiers and/or coloring pigments and/or their accessory agents.

To produce the suspension or paste in general a large number of particles, in particular the powder or granulated material, is mixed with a fluid. This mixing process is preferably carried out under vacuum in a vacuum mixer. It has also proved advantageous to add extremely finely ground silica to the particle mixture, prior to mixing with the fluid.

An advantage not previously achieved is that the flowable mixture in accordance with the invention presents no risks to health and can be processed substantially with unchanged technology regarding both procedures and apparatus.

In the following the invention is explained further with reference to exemplary embodiments.

In a first step a suspension or paste is produced or made available, which includes a mixture of many small particles comprising one or more thermoplastic plastics with elastic properties (thermoplastic elastomer TPE) such as SBS, SEBS or TPU. Such thermoplastic elastomers are in general made of a relatively highly flexible matrix with less flexible domains, as graft or block copolymers. The highly flexible macromolecules are responsible for the elasticity of the TPE, while the less flexible domains act as thermoplastic cross-linking sites and enable thermoplastic processing of the TPE.

To produce the particle mixture, first a raw material with a composition corresponding to the desired complement of particles is generated, preferably by extruding (or: an extrusion process) in an extruder, which as a procedure that is still customarily employed in its original form need not be described further here.

The raw material is a compound of
- 1% to 100% by weight TPE, in particular SBS and/or SEBS and/or TPU,
- 0% to 80% by weight other TP(s), in particular PP and/or PE and/or PB and/or PS,
- 0% to 80% by weight filler(s), in particular talcum and/or chalk and/or mineral powder and/or duroplastic powder and/or glass powder and/or soot and/or titanium dioxide and/or calcium carbonate ($CaCO_3$),
- additives, in particular flow-improving agents and/or thermal stabilizers and/or photostabilizers and/or aging stabilizers and/or separating agents and/or anti-foam agents and/or emulsifiers,
- coloring agents, in particular coloring pigments and/or their accessory agents and/or liquid dyes.

This raw material is now processed, in a granulation unit or cryogenic grinding unit (mill) connected in line with the extruder, to form appropriately small particles. For granulation it is possible to use in particular a heat-breakdown microgranulation process, e.g. an underwater microgranulation, or a droplet granulation process. Then there is disposed in line with the granulation unit an apparatus for water separation and a drying apparatus, by means of which the powder or granulated (microgranulated) material is dried.

In both cryogenic grinding and in granulation the size of the individual grains in the powder obtained by grinding or granulation, for instance in the case of at least 80% of the grains, is kept below a specified value, which as a rule is in the microregion. The value specified for maximal grain size can be 500 μm, 300 μm, 100 μm, 20 μm, 10 μm or even only 1 μm.

When the compound with the thermoplastic elastomer(s) has been converted to a powder with the prescribed grain size, it is mixed with a fluid or fluid mixture and additives to form a suspension.

The fluid used here can be natural vegetable oil, paraffinic white oil or in general a liquid petroleum derivative. As additives preferably extremely finely ground silica (Aerosil), pigments and stabilizers are employed.

The plastic powder and the fluid (with its additives) are mixed in a ratio between 99:1 and 1:99, in particular between 70:30 and 30:70, and preferably in the region of 50:50, in each case with reference to percentages by weight.

For production of the suspension, three specific examples will now be given:

EXAMPLE 1

An SBS is cryogenically ground until its grain size is less than 20 μm. The powder is put into a vacuum mixer with 30% paraffinic white oil, very finely ground silica (Aerosil), pigments and stabilizers and mixed to form a suspension.

EXAMPLE 2

A mixture of 70% SBS, 10% PP, 5% talcum, 10% liquid and 5% other additives and coloring agents is compounded and homogenized in the extruder. In an underwater microgranulation apparatus connected in line with the extruder, the compound is granulated to a grain size below 250 μm. The powder is put into a vacuum mixer with very finely ground silica (Aerosil), pigments and stabilizers, and fluid is added for mixing.

EXAMPLE 3

A mixture of 40% SBS, 30% PP, 10% talcum, 10% liquid and 5% other additives and coloring agents is compounded and homogenized in the extruder. In an underwater microgranulation apparatus connected in line with the extruder, the compound is granulated to a grain size below 50 μm. In a vacuum mixer the powder is mixed in the ratio 2:1 with another or the same fluid. Prior to mixing, small amounts of very finely ground silica (Aerosil), pigments and stabilizers are added to the mixture.

The finished suspension or paste can now be processed further, in various ways, to produce a plastic body.

In an advantageous embodiment the suspension is put into a mold, but does not fill the entire cavity within the mold; the amount or volume of the suspension in the mold depends on the desired thickness of the wall of the finished hollow body. The mold is then placed in an oven in which the processing temperature is set to be between 50° C. and 350° C., in particular between 160° C. and 260° C. and in the vicinity of about 200° C. Now the mold is rotated uniformly about several axes at these process temperatures. After a certain time—e.g., in the case of a doll's leg, after ca. 7 min.—gelation of the suspension produces a coherent, substantially solid hollow body on the inner surface of the mold, which can be removed from the mold after the mold has been taken out of the oven and cooled. The mold is preferably made of metal, but can also consist of another material such as ceramic or plastic.

For this rotational casting process to produce a hollow body from the suspension, all known methods and apparatus can be used, in particular the techniques cited above from the "*Kunststoff-Kompendium*" by Adolf Franck. Alternatively, all other known processes for gelation can be used for this suspension, in particular those mentioned above that are described in the "*Kunststoff-Kompendium*" by Adolf Franck. These include, with no restriction of generality, the methods of casting, dipping and coating (or: blade coating).

The invention claimed is:

1. Method for the production of at least one body, in which the body is formed from a flowable mixture of particles and a fluid, the particles in the flowable mixture containing at least one thermoplastic elastomer, and at least one of a further thermoplast other than PVC and a filler.

2. Method according to claim 1, wherein the particles contain the at least one thermoplastic elastomer in a proportion ranging from about 1% by weight to about 100% by weight.

3. Method according to claim 1, wherein the particles contain at least in part a mixture or composite or compound of a plurality of thermoplastic elastomers.

4. Method according to claim 1, wherein the at least one thermoplastic elastomer is selected from a group containing styrolethylene-butylene-styrene (SEBS), styrene butadiene-styrene (SBS) and thermoplastic polyurethane (TPU).

5. Method according to claim 1, wherein a flowable mixture is used in which the additional thermoplast comprises at least one of a polypropylene, a polyethylene, a polybutylene, and a polysterene.

6. Method according to claim 5, wherein a proportion of the further thermoplast is between 0% and 80% by weight.

7. Method according to claim 1, wherein is used wherein at least 50% of the particles have a particle size below 500μm.

8. Method according to claim 1, wherein at least some of the particles have a substantially spherical or fiber-like shape.

9. Method according to claim 1, wherein the particles have been produced by cryogenic grinding of a raw material containing the at least one thermoplastic elastomer and at least one other component.

10. Method according to claim 1, wherein the particles have been produced by granulation of a raw material containing the at least one thermoplastic elastomer and at least one further component, where appropriate with subsequent water separation and drying of a granulated material obtained by the granulation.

11. Method according to claim 9, wherein the raw material for cryogenic grinding has been produced by extrusion.

12. Method according to claim 1, wherein the filler is at least one of talcum, chalk, mineral powder, duroplastic powder, glass powder, soot, titanium dioxide, and calcium carbonate, in a proportion between 0 and 80°s by weight.

13. Method according to claim 1, wherein the flowable mixture further contains at least one of flow-improving agents, thermal stabilizers, photostabilizers, aging stabilizers, separating agents, anti-foam agents, emulsifiers, and extremely finely ground silica.

14. Method according to claim 1, wherein the flowable mixture further contains as a coloring agent at least one of coloring pigments, their accessory agents, and liquid dyes.

15. Method according to claim 1, wherein the flowable mixture has been produced by mixing a large number of the particles with a the fluid under vacuum.

16. Method according to claim 1, wherein a flowable mixture is used in which the fluid contains at least one member selected from the group of fluids that contains vegetable oil, petroleum derivatives, and paraffinic white oil.

17. Method according to claim 1, wherein the body is produced from the flowable mixture by gelation at at least one processing temperature.

18. Method according to claim 1, wherein
(a) a mold is filled at least partially with the flowable mixture, and
(b) the mold is kept at at least one processing temperature as a result of which the body is formed within the mold as a hollow body.

19. Method according to claim 18, wherein the mold is rotated with at least two rotational degrees of freedom.

20. Method according to claim 18, wherein after a predetermined period of time, the mold is cooled and the body is removed from it.

21. Method according to claim 1, wherein at at least one processing temperature
(a) a mold is dipped into the flowable mixture, and
(b) the body is formed on or in the mold.

22. Method according to claim 1, in which at at least one processing temperature
(a) the flowable mixture is brushed onto an object, and
(b) the body is formed as a coating on the object.

23. Method according to claim 1, wherein a processing temperature is used that is between 50° C. and 350° C.

24. Flowable mixture for manufacturing of hollow bodies made of plastic in a rotational casting method, wherein a mold is filled with a suitable amount of the mixture and is rotated about several axes in an oven at a suitable temperature and in which the mixture gels, wherein the mold is taken out of the oven, wherein the mold is cooled, and wherein the hollow body is removed from the mold, the flowable mixture comprising
(a) a powder, comprising particles with a grain size at least predominantly below 500 μm and which contain at least one first thermoplastic elastomer and at least one of further thermoplast other than PVC and a filler, and
(b) a fluid in which the powder is suspended.

25. Method according to claim 1, wherein wherein at least 80% of the particles have a particle size below 500 μm.

26. Method according to claim 1, wherein wherein at least 99% of the particles have a particle size of 500 μm.

27. Method according to claim 10, wherein the particles have been produced by one of heat-breakdown microgranulation, underwater microgranulation, and droplet granulation.

28. Method according to claim 10, wherein the raw material for granulation has been produced by extrusion.

29. Method according to claim 1, wherein the particles contain as a filler at least one of talcum, chalk, mineral powder, duroplastic powder, glass powder, soot, titanium dioxide, and calcium carbonate, in a proportion between 0 and 80% by weight.

30. Method according to claim 1, wherein raw materials for the production of the particles contain as a filler at least one of talcum, chalk, mineral powder, duroplastic powder, glass powder, soot, titanium dioxide, and calcium carbonate, in a proportion between 0 and 80% by weight.

31. Method according to claim 1, wherein the particles contain at least one of flow-improving agents, thermal stabilizers, photostabilizers, aging stabilizers, separating agents, anti-foam agents, emulsifiers, and extremely finely ground silica.

32. Method according to claim 1, wherein raw materials for the production of the particles contain at least one of flow-improving agents, thermal stabilizers, photostabilizers, aging stabilizers, separating agents, anti-foam agents, emulsifiers, and extremely finely ground silica.

33. Method according to claim 1, wherein the particles contain as a coloring agent at least one of coloring pigments, their accessory agents, and liquid dyes.

34. Method according to claim 1, wherein raw materials for the production of the particles contain as a coloring agent at least one of coloring pigments, their accessory agents, and liquid dyes.

35. Method according to claim 1, wherein at at least one processing temperature
(a) an object is dipped into the flowable mixture, and
(b) the body is formed on the object.

36. Method according to claim 1, wherein a processing temperature is used that is between 160° C. and 260° C.

37. Method according to claim 1, wherein a processing temperature is used that is about 200° C.

38. Flowable mixture for manufacturing at least one body, the flowable mixture comprising
(a) a powder comprising particles with a grain size of at least predominantly below 500 μm and which contain at least one thermoplastic elastomer and at least one of a further thermoplast other than PVC and at least one filler, and
(b) a fluid in which the powder is suspended.

* * * * *